No. 831,246. PATENTED SEPT. 18, 1906.
C. H. SINES.
DEVICE FOR HANDLING AND HOLDING BARBED WIRE.
APPLICATION FILED JUNE 18, 1906.
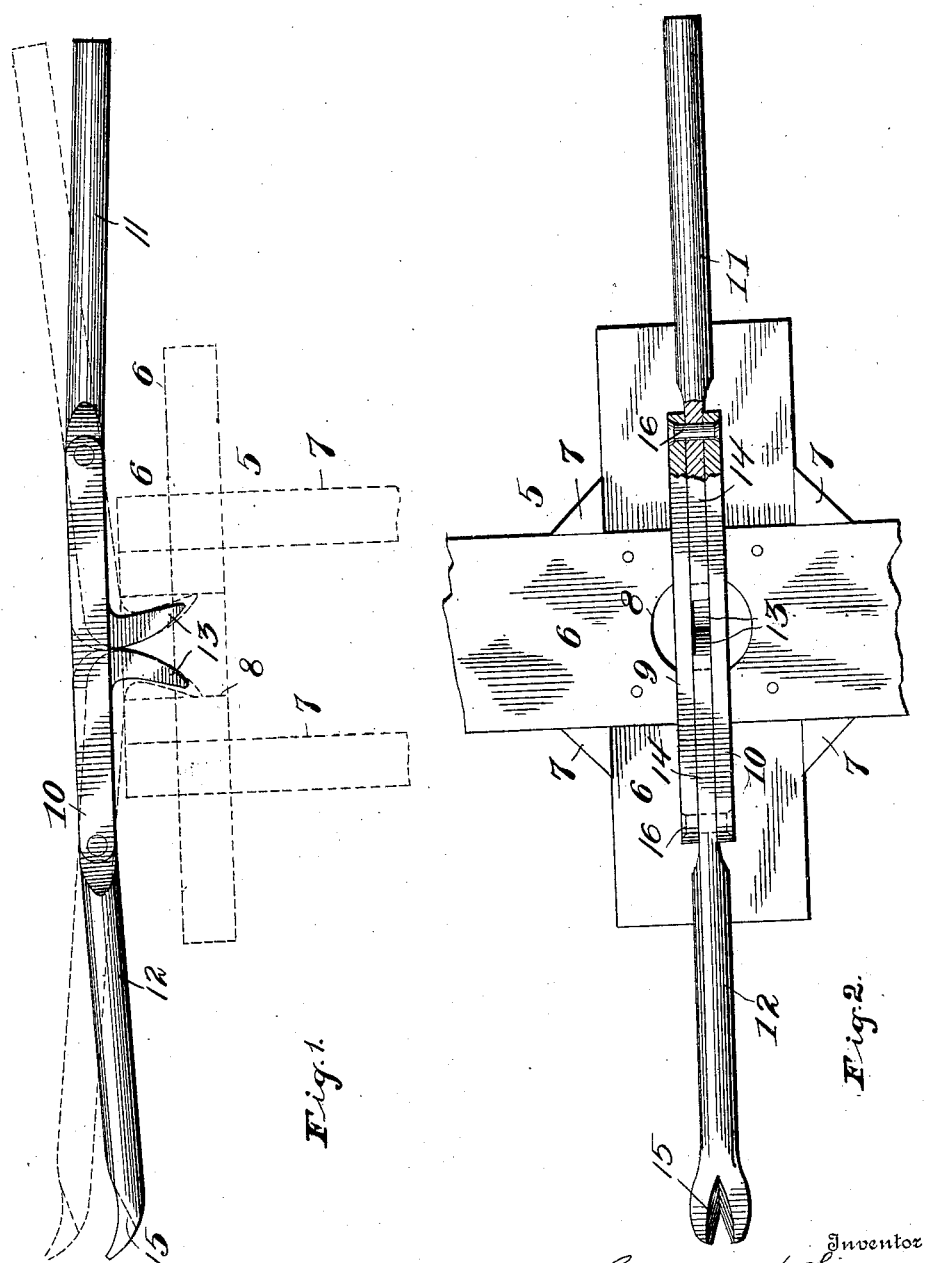
Witnesses
Carl Stoughton
F. G. Campbell
Inventor
Calandres H. Sines.
By 
Attorneys

UNITED STATES PATENT OFFICE.

CALANDRES H. SINES, OF NEW ALBANY, OHIO.

DEVICE FOR HANDLING AND HOLDING BARBED WIRE.

No. 831,246.  Specification of Letters Patent.  Patented Sept. 18, 1906.

Application filed June 18, 1906. Serial No. 322,155.

*To all whom it may concern:*

Be it known that I, CALANDRES H. SINES, a citizen of the United States, residing at New Albany, in the county of Franklin and State of Ohio, have invented certain new and useful Improvements in Devices for Handling and Holding Barbed Wire, of which the following is a specification.

My invention relates to a device for handling and holding barbed wire, and has for its object the provision of a tool of this character adapted to readily engage with the spools upon which barbed wire is usually wound to enable said spools to be moved from place to place or to engage said barbed wire when it is being applied to a fence to hold said barbed wire from slipping when the wire-stretcher is disengaged therefrom preparatory to securing a fresh hold thereon.

It is a well-known fact that barbed wire is extremely difficult to handle when wound upon the spools in the form in which it is usually shipped from the factory. This is due to the fact that said wire presents numerous barbs or points projecting in all directions which engage in the clothing or the flesh of the persons who attempt to lift a spool of this wire, which is quite heavy. The present invention renders it possible to lift a spool of this wire without its being necessary for the operator to touch the spool with his hands.

In the accompanying drawings, Figure 1 illustrates a view in side elevation of my improved wire-handling device in two positions, the gripping position being illustrated in dotted lines and the disengaged position being illustrated in full lines. In said Fig. 1 a portion of a barbed-wire spool is illustrated in dotted lines. Fig. 2 is a plan view of the parts shown in Fig. 1.

Like numerals designate corresponding parts in both of the figures of the drawings.

Referring to the drawings, the numeral 5 designates a spool such as barbed wire is commonly wound upon. This spool comprises the crossed end pieces 6, which form the side members of the spool, and the transversely-disposed pieces 7, upon which the wire is wound. The crossed pieces 6 have an opening 8 formed therethrough, through which a stick may be inserted when it is desired to rotatively mount the spool to run the wire therefrom. While in the store the spool usually rests upon one of its sides, presenting its other side in a horizontal plane, as is illustrated in Fig. 1.

The tool comprising the present invention consists of two links 9 and 10. Handles 11 and 12 are pivoted upon rivets or other fastening devices 16 which bind the links 9 and 10 together, said handles being pivoted between said links. Downturned fingers 13 are formed upon the inner ends of these handles, said handles having reduced portions 14, which work between the links 9 and 10. The outer end of one of the handles is bifurcated, as at 15, to serve a purpose which will be hereinafter described.

The operation of the device when it is used for lifting a spool of barbed wire from place to place is as follows: With the parts lying in the position illustrated in Fig. 1 the fingers 13 are inserted in the opening 8 of the spool. The outer ends of the handles are then lifted, preferably by two persons, though it is possible for one person to do so, until the parts assume the dotted-line position shown in Fig. 1. At this time the lower ends of the fingers lie against the walls of the opening 8 and grip the spool with sufficient force to permit it to be lifted from the ground. When the spool is again rested upon the ground and the parts moved to the full-line position, the device may be readily disengaged from the spool. This tool is useful for handling spools of barbed wire in the factory, in the store from which they are sold, or in the field while stringing fences. When used for this latter purpose, the bifurcated end 15 of one of the handles may be engaged about the wire that is being strung and behind one of the barbs, and by then using said handle as a pry against a fence-post the wire may be held against slipping while the ordinary wire-stretcher is being disengaged from said wire preparatory to securing a fresh grip thereon to continue the stretching operation.

From the foregoing description it will be seen that simple and efficient means are herein provided for accomplishing the objects of the invention; but while the elements shown and described are well adapted to serve the purposes for which they are intended it is to be understood that the invention is not limited to the precise construction set forth, but includes within its purview such changes as may be made within the scope of the appended claim.

What I claim is—

In a device of the character described, the combination with a pair of parallel links, of a pair of members pivoted midway of their ends between said links, the outer portions of said members forming handles and the inner portions of said members being reduced and flattened to pass between the links and the inner ends of said members having downturned hooks which are inclined away from each other.

In testimony whereof I affix my signature in presence of two witnesses.

CALANDRES H. SINES.

Witnesses:
FRANK G. CAMPBELL,
A. L. PHELPS.